United States Patent [19]

Brüning et al.

[11] 4,012,363

[45] Mar. 15, 1977

[54] COATING POWDERS ON THE BASIS OF THERMOPLASTIC POLYESTERS

[75] Inventors: Klaus Brüning, Bergisch-Gladbach; Karl-Günter Sturm, St. Augustin; Siegfried Hahn, Siegburg-Kaldauen, all of Germany

[73] Assignee: Dynamit Nobel Aktiengesellschaft, Troisdorf, Germany

[22] Filed: Aug. 21, 1974

[21] Appl. No.: 499,250

[30] Foreign Application Priority Data

Sept. 15, 1973 Germany ............... 2346559

[52] U.S. Cl. ............... 260/75 R; 260/40 R; 427/185; 427/195; 428/430; 428/458; 428/480

[51] Int. Cl.² ............... C08G 63/18

[58] Field of Search ............... 260/75 R

[56] References Cited

UNITED STATES PATENTS

| | | | |
|---|---|---|---|
| 3,232,813 | 2/1966 | Newton | 260/75 R X |
| 3,423,281 | 1/1969 | Wiener | 260/75 R X |
| 3,505,293 | 4/1970 | Bond et al. | 260/75 R |
| 3,682,863 | 8/1972 | McHale | 260/75 R |
| 3,864,314 | 2/1975 | Modler et al. | 260/75 R |
| 3,868,338 | 2/1975 | Parsons et al. | 117/161 K |

OTHER PUBLICATIONS

Smith, Society of Plastics Engineers, Akron Section, Regional Technical Conference, Technical Papers (1967) pp. 11–16.

Chen, et al., Def. Pub. of Serial No. 402,246, filed 10/1/73, Published in O.G. 925, on 8/6/74, Def. Pub. No. T925,005.

*Primary Examiner*—Murray Tillman
*Assistant Examiner*—W. C. Danison, Jr.
*Attorney, Agent, or Firm*—Burgess, Dinklage & Sprung

[57] ABSTRACT

An improvement in a process for coating a substrate by a powder coating process wherein a polyester powder is applied to said substrate which improvement comprises using as the polyester powder a partially crystalline powder of a polyester condensation product of an acid component comprising an acid or ester of at least terephthalic acid and a diol component at least 50 molar percent of which is 1,4-butanediol; a polyester coating powder which is a partially crystalline polyester of an acid component at least part of which is an acid or ester of terephthalic acid and a diol component at least 50 molar percent of which is 1,4-butanediol, said powder having a glass transition temperature between −20° and +50° C., measured as the attenuation maximum in accordance with Deutsche Industrie Norm 53,445 a reduced $n_{red}$ viscosity of at least 0.6, measured in a 1 weight percent solution of a mixture of 60 parts by weight phenol and 40 parts by weight phenol and 40 parts by weight 1,1,2,2-tetrachloroethane at 25° C. and a melting maximum, determined by differential thermoanalysis, of about 150° to 200° C.

13 Claims, No Drawings

COATING POWDERS ON THE BASIS OF THERMOPLASTIC POLYESTERS

BACKGROUND OF THE INVENTION

1. Field of the Invention

This invention relates to thermoplastic partially crystalline polyester coating powders particularly useful in fluidized bed sintering processes, electrostatic powder coating and electrostatic fluidized bed process. More particularly, this invention is directed to an improvement in powder coating process wherein a polyester powder is applied to a substrate. This invention is particularly directed to obtaining polyester coating on substrates which polyester coatings are applied to the substrate by a powder coating process wherein the resultant coating cannot be loosened from the substrate by a knife, the coating exhibits good Erichsen elasticity and has a good appearance. More especially this invention is directed to partially crystalline thermoplastic polyester coating powders having good stability in storage.

2. Discussion of the Prior Art

It is known to produce coatings by a fluidized bed process or by the electrostatic powdering method, using thermoplastic polyesters. Either amorphous types of copolyester are used or highly crystalline polyesters such as those formed from polyethylene terephthalate (PETP).

Amorphous polyesters or caoting powders made therefrom in many respects having outstanding adhesive characteristics with respect to many metals. They can be used in fluidized bed coating processes wherein they are deposited on such metal substrates. They are used advantageously on such substrates on account of their weather-resistant properties. A serious disadvantage has been found in the use of such amorphous types of copolyesters. They are characterized by poor stability in storage. Additionally, the elasticity of the resultant coating is often inadequate, especially where the coating has a thickness greater than 150 microns, such as those coatings produced by the fluid bed method.

During storage and transportation it has been additionally found that such coating powders tend to become lumpy so that they are no longer practically usable. In addition, the dipping of hot parts into such powders heats the vats employed in the fluidized bed process which contain the polyester powders to such an extent that such polyester powders stick to the walls and to the porous bottom. Pieces which are coated with such powders are not resistant to hot water. The inadequate elasticity of the coatings in the greater thicknesses is evidenced by crazing under mechanical stress and by poor Erichsen cupping and impact indentation characteristics.

Many efforts have been made to provide suitable coating powders from polyesters derived from polyethylene terephthalic, polytetramethylene terephthalic and other highly crystalline polyesters. Experiments have shown that the stability in storage of such coating powders is excellent. These polyesters have the disadvantage, however, that the elasticity of the coatings and the adhesion characteristics are poor, and especially on smooth metal surfaces. The tensions which may occur within the coatings are in some cases so great that even mild mechanical stress, such as when coated metal substrates are bent, results in cracking. The coated films can then readily be lifted from the metal substrates surface.

The mechanical characteristics and the adhesive properties of such coatings cannot be improved sufficiently by quenching the hot pieces immediately after coating. If highly crystalline polyesters of great molecular weight are employed an improvement of mechanical properties is achieved but the appearance of the coated metal parts suffers due to poor leveling. Overall this is a very negative effect.

There is thus a desire to provide suitable coating powders of thermoplastic polyesters. Thus far thermoplastic polyesters have not achieved any great economical importance owing to the aforenoted disadvantages. It is an object of the present invention, therefore, to provide polyester coating powders which do not suffer from the above-described disadvantages, provide coatings which are characterized by good elasticity and bending properties, are stable in storage, provide coatings having good appearance and are otherwise suited for coating by known powder coating procedures. It is a further object of the present invention to provide such polyester coating powders which will readily adhere even to smooth metal surfaces such that they do not become delaminated.

SUMMARY OF THE INVENTION

The objects of the present invention are provided by an improvement in a process for coating a substrate by a powder coating process wherein a polyester powder is applied to said substrate, which improvement comprises using as the polyester powder a partially crystalline powder of a polyester condensation product of an acid component comprising an acid or ester of at least terephthalic acid and a diol component, at least 50 molar percent of which is 1,4-butanediol.

In accordance with the present invention it has been discovered that superior polyester coatings on substrates, particularly smooth metal substrates, can be provided by the appropriate choice of thermoplastic polyester coating powder. Specifically, it has been found that certain partially crystalline polyesters can be employed without any difficulty either in processing or in the final product as coating powders. These polyester powders have the following characteristics:

1. They are partially crystalline polyesters;
2. They have a glass transition temperature between −20° and +50° C., as determined as the attenuation maximum in accordance with Deutsche Industrie Norm 53,445;
3. They have a reduced $n_{red}$ viscosity of at least 0.6, preferably 0.7 to 1.0, has determined in a 1 weight percent solution of a mixture of 60 parts by weight phenol and 40 parts by weight 1,1,2,2-tetrachloroethane at 25° C; and
4. They have a melting maximum, determined by differential thermoanalysis, of 150° to 220° C., preferably 170° to 190° C.

It has been discovered, in accordance with the present invention, that powder coating processes such as the fluidized bed sintering process, the electrostatic powder coating process, the electrostatic fluid bed process, can all be employed to advantage in the coating of substrates with polyester powders if the polyester powder has the above properties. Generally speaking such polyesters are derived from a polyester polycondensation product of an acid component, which acid component comprises and acid or ester, especially lower alkyl ester, of at least terephthalic acid and a diol component, at least 50 molar percent of which is 1,4-butanediol. It has been discovered that such polyesters can be used to provide coatings of exceptional properties not heretofore possessed by polyesters generally.

DESCRIPTION OF PREFERRED EMBODIMENTS

The partially crystalline polyesters used in accordance with the invention are derived as regards their acid component from terephthalic acid, mixed, if desired, with one other aromatic and/or aliphatic dicarboxylic acid or its polyester-forming derivatives. As regards the diol component, 1,4-butanediol is employed. One can replace up to 50 mol percent of the 1,4-butanediol with an aliphatic diol having 2 to 12 carbon atoms, especially an alkanediol.

The preferred co-acids are isophthalic acid or its esters, especially lower alkyl ($C_1$-$C_4$) esters. They can be replaced wholly or partially by at least one aliphatic dicarboxylic acid or its polyester-forming derivative. Adipic, azelaic or sebacic acid or mixtures thereof are preferred.

Saturated aliphatic diols having 2 to 12 carbon atoms can be used as co-diols. They can be branched if desired. Examples are ethylene glycol, 1,6-hexanediol, neopentyl glycol, etc.

Suitable for the preparation of the coating powders of the invention are, for example, those polyesters in whose preparation the monomers were used in the molar ratios set forth below (expressed in mole percent).

1. Polyesters derived from 60 to 90 mole percent terephthalic acid or dimethylterephthalate, and 40 to 10 mole percent, respectively, of a co-acid and 100 mole percent of 1,4-butanediol.

2. Polyesters and copolyesters of terephthalic acid and a co-acid or its polyester-forming derivative, e.g., dimethylterephthalate of the following composition:

| Terephthalic acid/co-acid | Butanediol/ethylene glycol |
|---|---|
| 100/0 | 75/25 to 50/50 |
| 90/10 | 85/15 to 50/50 |
| 70/30 | 100/0 to 50/50 |

3. Polyesters derived from the following sets of components:

| Terephthalic acid/co-acid | 1,4-butanediol/1,6-hexanediol |
|---|---|
| 100/0 | 85/15 to 60/40 |
| 90/10 | 95/5 to 65/35 |
| 80/20 | 100/0 to 75/25 |
| 70/30 | 100/0 to 85/15 |
| 60/40 | 100/0 to 95/5 |

In a preferred embodiment of the invention, those polyesters are used whose acid component consists of 85 to 60 mole percent of the dimethyl ester of terephthalic acid mixed with 15 to 40 mole percent of isophthalic acid, respectively, up to 10 mole percent of the isophthalic acid being replaceable by azelaic acid; 1,4-butanediol is preferred as the diol component.

The preparation of the partially crystalline polyesters used in accordance with the invention is not per se, the subject matter of the present invention. They can be prepared by known methods, e.g., analogously to the preparation of polyethylene terephthalate. A suitable technique is as follows:

In an autoclave provided with a stirrer, dimethylterephthalate and dimethylisophthalate, to be transesterified are charged, in a molar ratio specified above. To the vessel there is added 1,4-butanediol in the presence of a transesterification catalyst such as tetra-n-butyltitanate. Zinc acetate dihydrate can also be employed.

At an internal temperature of about 150° to 200° C., the methanol is distilled off at normal pressure, and then a co-acid—sebacic acid, for example—is added. For the esterification of the sebacic acid, the temperature is raised to 250° C. and the mixture is let stand for about 2 hours. The completeness of the esterification is tested by measuring the amount of reaction water that has distilled over. After injecting triphenylphosphite with a quantity of diol (to inhibit the transesterification catalyst), a vacuum is applied and the internal temperature is raised to 270° C. Within half an hour, the internal temperature is then increased to 270° C. and immediately the pressure is reduced to less than 1 Torr. After 3 to 4 hours of stirring under the last-described conditions the vacuum is broken by the introduction of nitrogen, the contents of the autoclave are removed through the bottom valve, and granulated.

The polyester used in accordance with the invention can be homogenized with suitable leveling agents and pigments by premixing them in a high-speed mixer and then working them through an extruder or co-kneader at, for example, 180° C. For example, 84.5 parts by weight of ground polyester can be mixed with 15 parts by weight titanium dioxide and 0.5 parts by weight of a leveling agent commercially obtainable under the name "Modaflow". It is desirable to powder the pigmented, homogenized and granulated material in impact-plate mills, pin mills or air-jet mills with the material deep frozen.

The powder coatings can be applied to the substrates by any desired powder coating process, although fluid bed sintering (FBS), electrostatic powder coating (EPC) and the electrostatic fluid bed (EBF) processes are preferred. The coating powders of the invention are especially well suited for the production of homogeneous, firmly adherent coatings on substrates through coating by the fluid bed sintering method.

In fluid bed sintering (FBS) a preheated metal part is immersed into the coating powder of the invention, which is kept suspended by a gentle flow of air. The grain size of the powder generally ranges between 60 and 300 microns. The powder is suspended by blowing air through a porous bottom of a container so that it assumes a fluid state. The pieces to be coated are preheated to 250° to 400 ° C. and dipped into this fluid bed. The immersion time of the material being coated depends on the thickness of the coating that is to be produced and amounts to from 1 to 12 seconds. In general, the finished coating is prepared in a single procedure in about 3 to 7 seconds. Coating thicknesses between 200 and 500 microns are achieved.

In the electrostatic powder coating (EPC) process, the coating powder of the invention, which has a grain size of under 100 microns, preferably from 30 to 60 microns, is blown by compressed air into the applicator where it is charged with a voltage of 30 to 100 kV by a high-voltage direct current, and sprayed onto the surface of the material to be coated. Then it is baked on at specific temperatures for specific lengths of time in suitable ovens. The powder adheres to the cold workpiece due to its charge because it loses its charge slowly on account of its high electrical resistance of approximately $10^{13}$ to $10^{17}$ ohms · centimeter. Coating thicknesses between 40 and 120 microns are produced.

In the electrostatic fluid bed (EFB) process, the two procedures are combined by mounting annular or partially annular electrodes over a fluid bed containing the powder so as to produce the electrostatic charge of, for example, 50 to 100 kV. Plates heated above the sintering temperature of the powder, at for example 250° to 400° C., are briefly dipped into the powder cloud without post-sintering, or cold or preheated plates are provided with a powder coating by electrostatic methods and the coating is fused by post-sintering at temperatures specific for the plastic powder.

Numerous substrates can be coated by these powder coating methods with powders of the invention, within the limits, allowed by the fusing process or the heating time, as the case may be. The preferred substrates are metals; but other materials, such as glasses or ceramic articles or other heat resistant materials can be coated.

The polyesters used in accordance with the invention have a reduced viscosity $n_{red}$ of at least 0.6. Particularly suitable are those having a reduced viscosity of 0.7 to 1.0. However, polyesters with reduced viscosities in excess of 1.0 can be used in accordance with the invention. In practice, those having a reduced viscosity up to about 1.5 have proven practical.

In order to more fully illustrate the nature of the invention and the manner of practicing the same the following examples were presented. In the examples when measurements are made to determine differential thermoanalysis of the polyester coating powder a differential scanning colorimeter model DSC-1 made by Perkin-Elmer was used having a heating rate of 16° C. per minute.

Glass transition temperatures are measured in accordance with DIN 53,445 as the maximum of the mechanical damping decrement of the tortional vibration analyses.

The reduced viscosities ($n_{red}$) of the polymers is measured in a 1 weight percent solution in a mixture of 60 parts by weight phenol and 40 parts by weight of 1,1,2,2-tetrachloroethane at 25° C. The reduced viscosity is computed by the following formula:

$$n^{-}_{red} = \frac{\frac{t_L}{t_{Lm}} - 1}{c}$$

wherein $t_L$ represent the pouring time of the solution, $t_{Lm}$ the pouring time of the solvent and c the concentration in grams per 100 ml. The measurements performed during the examples were performed by the following methods:

Criss-cross cut characteristic - Deutsche Industrie Norm 53,151;
Erichsen cupping - Deutsche Industrie Norm 53156
Stability in storage was measured by the following method:

The free-flowing ability of the ready to use coating powder was compared before and after storage at elevated temperature. The storage stability is given in °C and is defined as the temperature at which the powder just ceases to be free-flowing.

To determine the resistance to hot water, the coated substrates were kept in boiling water for 6 hours. Judgment was visual. After such treatment the surface must not show any bubbles or crazing.

In Examples 1 to 7, if the electrostatic powder coating process was employed, the grain size of the coating powder was greater than 100 microns, most of the grains had a grain size of 30 to 60 microns. An applied voltage of 80 kV was employed. The baking was performed at 200° C. for 11 minutes. The test plates were untreated steel plates having a 0.8 mm. thickness and being ground on both sides (type 1405, Deutsche Industrie Norm 1623).

The fluidized bed sintering process employed in the Examples, too was performed using powder having grain sizes of 63 to 315 microns, predominantly in the range of 100 to 200 microns. Coating conditions were as follows: The test plates were heated to 400° C. The preheating time was 2 minutes and the immersion time was 3 seconds. The tests plates employed were black steel plates type ST 37 in accordance with Deutsche Industrie Norm 1541 utilizing sandblasted plates having a 1.5 mm. thickness.

There is set forth below various examples showing the use of prior art amorphous polyester, highly crystalline polyesters and partially crystalline polyester coating powders of the present invention. The comparative examples show that the amorphous and highly crystalline polyesters do not satisfy the requirements that must be met by a coating powder.

EXAMPLE 1 (Example for Comparison)

An amorphous polyester composed of 90 mole percent terephthalic acid, 10 mole percent sebacic acid, 60 mole percent ethylene glycol, 30 mole percent neopentyl glycol and 10 mole percent diethylene glycol, having a glass transition temperature of 45° C. and a reduced viscosity of 0.75, was intensively mixed with 25 weight percent $TiO_2$ and 0.5% Modaflow in an extruder at 130° to 140° C., coarsely crushed after cooling, and then ground to the appropriate grain size under deep freeze. Coatings prepared with these powders had the following properties:

a. Fluid bed sintered coatings (FBS process) of 250 to 300 microns thickness on 1.5 mm. thick test plates:

Adhesion: Criss-cross cut characteristic: GT 0. The coating could not be loosened with a knife.
Elasticity: Erichsen cupping: 1 to 2 mm. Tension cracks were produced by bending the plates.
Surface appearance: Levelness of coating satisfactory. Resistance to hot water non-extent. Coating softens very quickly even upon immersion in water 90° C. hot.

b. Electrostatic coating (EPC process) of approximately 50 to 60 microns thickness on test plates 0.8 mm. thick.
Adhesion: Criss-cross cut characteristic: GT 0 The coating could not be loosened with a knife.
Elasticity: Erichsen cupping 7 mm. No tension cracks produced by bending the plates.
Surface Appearance: Coatings had pronounced orange-peel texture. The coating powders of (a) and (b) had very poor stability in storage, of 40° C.

EXAMPLE 2 (Example for Comparison)

A crystalline polyester on the basis of terephthalic acid and ethylene glycol having a glass transition temperature of about 85° C., a reduced viscosity of 1.4 and a melting maximum as measured on the differential scanning calorimeter of 255° C was made into a fluid bed coating powder as described in Example 1 and sintered onto steel plates 1.5 mm. thick.
Adhesion: Criss-cross cut characteristic: GT 4. Coating could be loosened with a knife.
Elasticity: Erichsen cupping less than 1 mm. Tension cracks produced by bending the plates.
Surface Appearance: Coatings have an even more pronounced orange-peel texture than those described in Example 1b.

The storage stability of the coating powder is good and is better than 100° C.

EXAMPLE 3 (Example for Comparison)

A crystalline polyester on the basis of terephthalic acid and 1,4-butanediol, having a glass transition temperature of about 50° C., a reduced viscosity of 1.4 and a melting maximum of 225° C. measured in the differential scanning calorimeter, was made by the method described in Example 1 into a fluid bed sintering powder and sintered onto 1.5 mm. thick test plates.
Adhesion: Criss-cross cut characteristic: GT 4. The coating could be loosened with a knife.
Elasticity: Erichsen cupping less than 1 mm. Tension cracks produced by bending the plates.
Surface Appearance: The coatings have an orange-peel texture approximately as great as that of Example 1b.

The storage stability of the coating powder is very good and is better than 100° C.

EXAMPLE 4 (Example for Comparison)

A polyester on the basis of 70 mole percent terephthalic acid, 30 mole percent isophthalic acid and 1,4-butanediol, and having a glass transition temperature of about 45° C., a melting maximum of 175° C. as measured on the DSC, but a, reduced viscosity $n_{red}$ of 0.5, was made into a fluid bed sintering powder by the method described in Example 1 and sintered onto test plates 1.5 mm. thick.
Adhesion: Criss-cross cut characteristic: GT 4. After 24 hours of standing at room temperature the coating could be loosened with the knife.
Elasticity: Erichsen cupping 1 to 2 mm. Tension cracks were produced by bending the plates. After 7 days of standing at room temperature, crazing occurred even though the plates were not exposed to mechanical stress.
Surface Appearance: The coatings were good as regards leveling. No orange-peel effect was observed.

The storage stability of the coating powder is good and is better than 100° C.

EXAMPLE 5 (Per the invention)

A polyester on a basis of 75 mole percent dimethylterephthalate, 25 mole percent dimethylisophthalate and 1,4-butanediol, having a glass transition temperature of about 45° C., a reduced viscosity $n_{red}$ of approximately 0.9 and a melting maximum as measured on the DSC of 190° C., was intensively mixed with 15 weight percent TiO$_2$ and 0.5 weight percent of Modaflow was homogenized, ground and sifted as described in Example 1.

Coatings produced with these powders had the following characteristics, the same test plates as in Examples 1 to 4 being used as substrates:

a. Fluid bed sintered coatings of approximately 250 to 300 microns thickness on test plates 1.5 mm. thick:
Adhesion: Criss-cross cut characteristic GT 0. The coating could not be loosened with a knife.
Elasticity: Erichsen cupping 8 to 10 mm. No tension cracks were produced by bending the plates.
Surface Appearance: The coatings showed good leveling. Hot water resistance is very good. After 6 hours in boiling water the surface appearance was unchanged.
b. Electrostatic Powder Coating (EPC) approximately 50 to 60 microns thickness on test plates 0.8 mm. thick:
Adhesion: Criss-cross cut characteristic: GT 0. The coating could not be loosened with a knife.
Elasticity: Erichsen cupping 10 mm. No tension cracks were produced by bending.
Surface Appearance: The coatings had a slight orange-peel effect. Hot water resistance was the same as in Example 5a.

Both coating powders had a very good storage stability of better than 100° C.

EXAMPLE 6 (Per the Invention)

A polyester on the basis of 65 mole percent dimethyl terephthalate, 30 mole percent isophthalic acid, 5 mole percent azelaic acid and 1,4-butanediol, having a glass transition temperature of 35° C., a reduced viscosity $n_{red}$ of approximately 0.9 and a melting maximum on the DSC of 170° C. was made into powder as in Example 1 and applied by the powder coating process.

a. Fluid Bed Sintered Coatings (FBS process) of approximately 250 to 300 microns thickness on 1.5 mm. thick test plates:
Adhesion: Criss-cross cut characteristic: GT 0. Coating could not be loosened with a knife.
Elasticity: Erichsen cupping 10 mm. Tension cracks were not produced by bending the plates.
Surface Appearance: Coatings showed very good leveling. Hot water resistance was the same as in Example 5a.
b. Electrostatic Coating (EPC process) of approximately 50 to 60 microns thickness on 0.8 mm. thick test plates:
Adhesion: Criss-cross cut characteristic: GT 0. Coating could not be loosened with a knife.
Elasticity: Erichsen cupping 10 mm. Tension cracks were not produced by bending the plates.
Surface Appearance: Coatings show a slight orange-peel effect.

The two coating powders of (a) and (b) have a very good storage stability of better than 100° C.

EXAMPLE 7 (Per the Invention)

A polyester on the basis of 70 mole percent dimethylterephthalate, 30 mole percent isophthalic acid, 90 mole percent 1,4-butanediol and 10 mole percent 1,6-hexanediol, having a glass transition temperature of 37° C., a reduced viscosity $n_{red}$ of about 0.9 and a melting maximum on the DSC of 166° C. was made into a fluidized bed sintering powder as in Example 1 and applied by the FBS process to 1.5 mm. thick test plates in a thickness of 250 to 300 microns.

Adhesion: Criss-cross cut characteristic: GT 0. Coating cannot be loosened with a knife.
Elasticity: Erichsen cupping 8 to 10 mm. Tension cracks not produced by bending plates.

Surface Appearance: Coatings show good leveling. Hot water resistance is the same as in Example 5a.

The storage stability of the powder is very good and is better than 100° C.

Generally speaking, coating powders in the case of electrostatic powder coating utilized in the present invention have a particle size of between 10 and 100 microns. A predominant portion, say, at least about 50% has a particle size of between 30 and 60 microns.

By applying the fluid bed sintering process and the electrostatic fluid bed process, coating powders utilized in the present invention have a particle size of between 60 and 300 microns. A predominant portion, say, at least about 70% has a particle size of between 120–250 microns.

What is claimed is:

1. A coating powder consisting essentially of a partially crystalline polyester, which partially crystalline polyester has a glass transition temperature between +20 and +50° C., as determined at the attenuation maximum in accordance with Deutsche Industrie Norm 53,445, a reduced viscosity ($n_{red}$) of 0.7 to 1.0, measured in a 1 weight percent solution in a mixture of 60 parts by weight phenol and 40 parts by weight of 1,1,2,2-tetrachloroethane at 25° C. and a melting maximum, determined by a differential of thermoanalysis, of 170° to 190° C., said coating powder having a grain size of 60–300 microns and being in admixture with a leveling agent and a pigment, said partially crystalline polyester being derived from at least 60 mol percent terephthalic acid or its ester, in respect of its acid component, and at least 50 mol percent, in respect of its alcohol content, of 1,4-butanediol.

2. A coating powder according to claim 1 containing residues of 60 to 90 mol percent of terephthalic acid or dimethylterephthalate, 10 to 40 mol percent of a co-acid component selected from the group consisting of isophthalic acid or its $C_1$–$C_4$ alkyl esters, adipic acid, sebacic acid and azelaic acid and 100 mol percent of 1,4-butanediol.

3. A coating powder according to claim 1 wherein the polyester-forming derivative contains 100 mol percent of a residue of terephthalic acid or its alkyl ester, 0 mol percent of another dicarboxylic acid, 50 to 75 mol percent of 1,4-butanediol and 25 to 50 mol percent of ethylene glycol.

4. A coating powder according to claim 1 wherein the polyester-forming derivative contains 90 mol percent of a residue of terephthalic acid or its alkyl ester, 10 mol percent of another dicarboxylic acid, 50 to 85 mol percent of 1,4-butanediol and 15 to 50 mol percent of ethylene glycol.

5. A coating powder according to claim 1 wherein the polyester-forming derivative contains 70 mol percent of a residue of terephthalic acid or its alkyl ester, 30 mol percent of another dicarboxylic acid, 50 to 100 mol percent of 1,4-butanediol and 0 to 50 mol percent ethylene glycol.

6. A coating powder according to claim 1 wherein the polyester-forming derivative contains 100 mol percent of a residue of terephthalic acid or its alkyl ester and no other dicarboxylic acid, 60–85 mol percent 1,4-butanediol and 15–40 mol percent 1,6-hexanediol.

7. A coating powder according to claim 1 wherein the polyester-forming derivative contains 90 mol percent of a residue of terephthalic acid or its alkyl ester, 10 mol percent of another dicarboxylic acid, 65–95 mol percent of 1,4-butanediol and 5–35 mol percent 1,6-hexanediol.

8. A coating powder according to claim 1 wherein the polyester-forming derivative contains 80 mol percent of a residue of terephthalic acid or its alkyl ester, 20 mol percent of another dicarboxylic acid, 75–100 mol percent of 1,4-butanediol and 0–25 mol percent of 1,6-hexanediol.

9. A coating powder according to claim 1 wherein the polyester-forming derivative contains 70 mol percent of a residue of terephthalic acid or its alkyl ester, 30 mol percent of another dicarboxylic acid, 85–100 mol percent of 1,4-butanediol and 0–15 mol percent of 1,6-hexanediol.

10. A coating powder according to claim 1 wherein the polyester-forming derivative contains 60 mol percent of a residue of terephthalic acid or its alkyl ester, 40 mol percent of another dicarboxylic acid, 95–100 mol percent of 1,4-butanediol and 0–5 mol percent 1,6-hexanediol.

11. A coating powder according to claim 1 derived from 60 to 85 mol percent of dimethyl ester of terephthalic acid mixed with 15 to 40 mol percent of an isophthalic acid.

12. A coating powder according to claim 1 wherein the acid component is derived from 60–85 mol percent of dimethyl ester of terephthalic acid and 15 to (40−$x$) mol percent of isophthalic acid wherein $x$ equals 0 to 10 mol percent, said polyester containing 0 to 10 mol percent of azelaic acid.

13. A coating powder according to claim 12 wherein azelaic acid is present in the acid component of the polyester.

* * * * *

UNITED STATES PATENT AND TRADEMARK OFFICE
CERTIFICATE OF CORRECTION

PATENT NO. : 4,012,363
DATED : March 15, 1977
INVENTOR(S) : Klaus Brüning et al

It is certified that error appears in the above-identified patent and that said Letters Patent are hereby corrected as shown below:

Column 1, line 10, "process" should read -- processes --.

Column 1, line 14, "coating" should read -- coatings --.

Column 1, line 30, "caoting" should read -- coating --.

Column 1, line 41, "coating" should read -- coatings --.

Column 2, line 55, "25°C;" should read -- 25°C.; --.

Column 2, line 68, "and" should read -- an --.

Column 6, line 16, "inthe" should read -- in the --.

Column 6, line 25, "polyester" should read -- polyesters --.

Column 6, line 57, "thick." should read -- thick: --.

Signed and Sealed this twelfth Day of July 1977

[SEAL]

Attest:

RUTH C. MASON
*Attesting Officer*

C. MARSHALL DANN
*Commissioner of Patents and Trademarks*